INVENTOR.
MART B. RIGGS

INVENTOR.
MART B. RIGGS

INVENTOR.
MART B. RIGGS

May 17, 1960 M. B. RIGGS 2,936,827
APPARATUS FOR MOUNTING AND INFLATING TUBELESS TIRES
Filed June 20, 1955 4 Sheets—Sheet 4
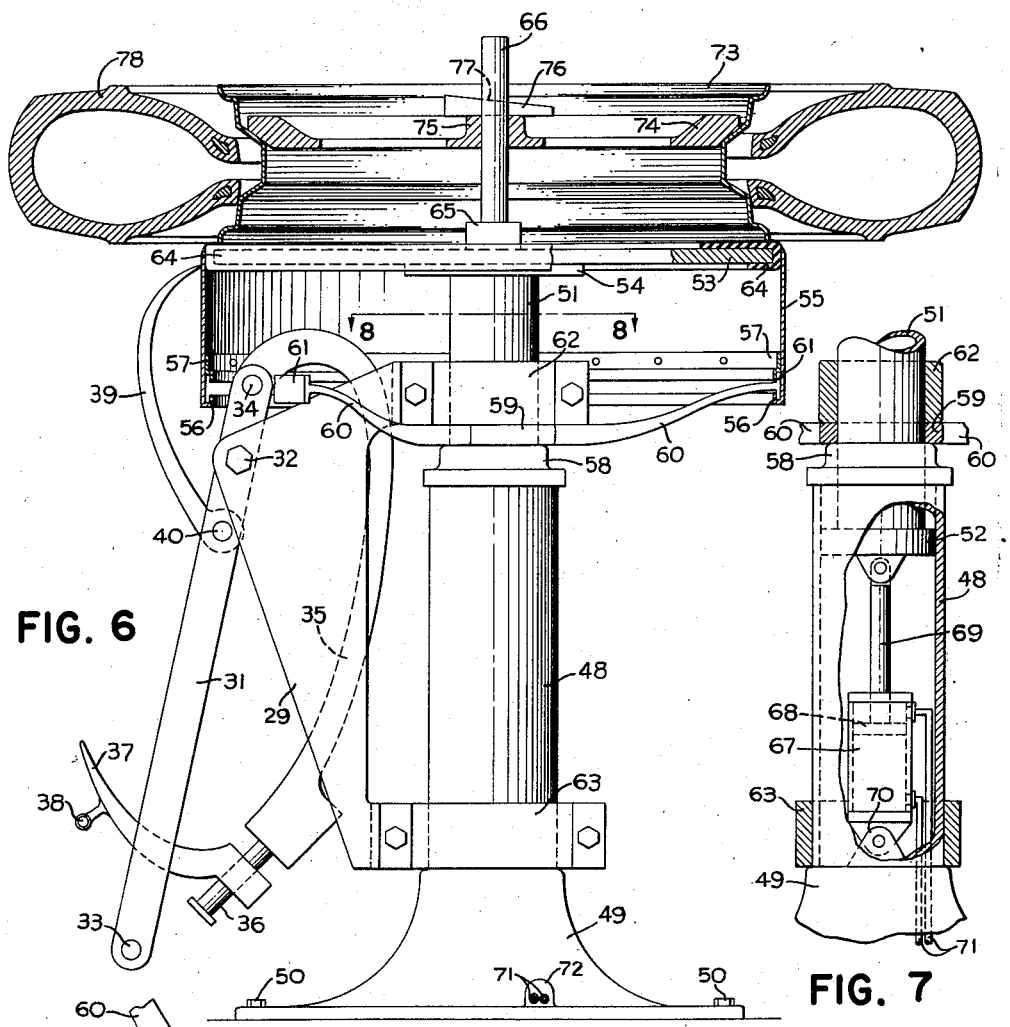
INVENTOR.
MART B. RIGGS
BY
ATTORNEY

United States Patent Office 2,936,827
Patented May 17, 1960

2,936,827

APPARATUS FOR MOUNTING AND INFLATING TUBELESS TIRES

Mart B. Riggs, Akron, Ohio, assignor to The Goodyear Tire & Rubber Company, Akron, Ohio, a corporation of Ohio Application June 20, 1955, Serial No. 516,635

9 Claims. (Cl. 157—1.1)

This invention relates generally to a method and apparatus for inflating tires and more particularly to a method and apparatus for mounting and inflating a tubeless tire on a drop-center rim.

The development of tubeless tires and the increasing prevalency of use of such tires in automotive applications has led to an associated problem of mounting and inflating such tires. Drop-center rims, which are utilized in the majority of cases, operate on the principle of dropping the relatively inextensible bead portions of the tire into a centrally located well, after which the beads must be forced onto the rim seats. While the beads are in the well, attempts to inflate through a rim valve normally utilized for pressurizing, only result in rapid escape of the air around the beads through the spaces between the beads and rim seats. It is to the sealing of this path of escape that this invention is directed.

The general object of the invention is to provide a method and apparatus for mounting and inflating a tubeless tire on a drop-center rim.

A further object of the invention is to provide a method and apparatus that is applicable for use with or on existing tire mounting and demounting machines.

A still further object of the invention is to provide for mounting and inflating a tubeless tire in a simple, efficient and economical manner.

The aforesaid objects of the invention, and other objects which will become apparent as the description proceeds, are achieved by first rigidly positioning the tire rim on a flat table having a circular outer edge and either previously mounting, or then mounting, a tire thereon with the beads in the well of the rim. A cylindrically shaped band, mounted so as to closely encompass the table edge, is then pushed against the tire sidewall adjacent one of the beads to force the other bead over against one side of the rim well. Sealing means are provided between the rim flange and the table surface and also between the band and the table edge. Thus, the table and band form a barrier to the escape of air from between the tire and rim. Air is then admitted to the tire chamber through the rim valve normally utilized for pressurizing the tire; the increasing internal pressure forcing the bead portions onto their respective rim bead seats. Inflation may then be continued until normal inflation pressure is reached.

In the drawings:

Fig. 6 is an elevation of a tire mounting and demounting machine illustrating another embodiment of the invention;

Fig. 7 is a cross-sectional view of the table actuating mechanism of the machine of Fig. 6; and Fig. 8 is a fragmentary view of a portion of the machine of Fig. 6, taken along line 8—8.

Figure 1:
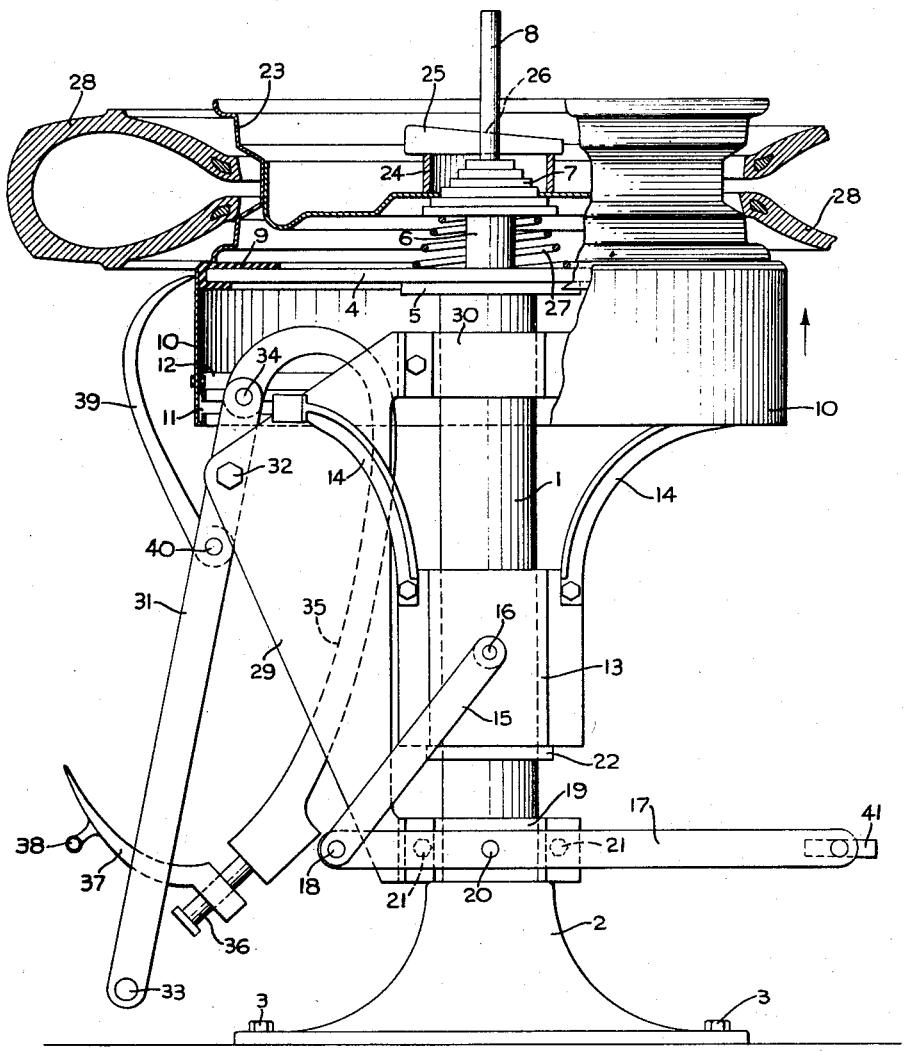
Fig. 1 is a front elevation of a tire mounting and demounting machine illustrating the invention.

In Fig. 1, a vertical column 1 is suitably supported at the lower end by a base pedestal 2 which may be secured to a foundation by bolts 3. At the upper end of the column 1, a table 4 is suitably secured to a flange 5 on the column 1. The table 4, as shown, is a continuous, flat, circular table; however, it will be understood that any suitable rim supporting surface, such as an open framework, may also be utilized. Extending upwardly along the central axis of the table 4 is a post 6 having a stepped alignment block 7 slidably placed on a reduced extension 8 of the post 6. The table 4 has suitable sealing means such as a resilient sealing strip 9 placed around the periphery thereof and extending substantially inwardly of the circumferential edge along both the upper and lower surfaces of the table 4. The strip 9 is preferably made of rubber and of smaller diameter than that of the table 4 so that it is held snugly in place when stretched over the table edge. A rigid cylindrically shaped band 10 encompasses the edge of table 4 and engages the sealing strip 9. The upper outer edge of the band 10 may be tapered in form for purposes of facilitating pressure sealing when contacting a tire sidewall in a manner that will be apparent as the description proceeds. The lower edge of the band 10 is bent inwardly and upwardly to form the lower part of a retaining channel 11; the upper part of the channel 11 being formed by an offset shaped ring 12 suitably secured to the band 10.

A sleeve 13, slidingly engaging the column 1, has suitably attached to the upper portion thereof three symmetrically spaced spider arms 14. At the band-engaging terminus, the spider arms 14 are formed in a T-shape and are slidingly arranged in the channel 11. To afford movement of the sleeve 13 along the column 1, a link 15 is pivotally secured by a pin 16 at one terminus thereof to the sleeve 13 and also pivotally secured at the other terminus thereof to an actuating lever 17 by a pin 18. The lever 17 in turn is pivotally mounted intermediate its length to a split-collar 19 by a pin 20. The split-collar 19 is rotatably mounted on the base of the column 1 and the two parts thereof are secured together by bolts 21. A stop ring 22, on the column 1, is provided to limit the downward movement of the sleeve 13.

A drop-center wheel 23 may be centered on the surface of the table 4 by placing the hub opening over the stepped block 7 and then securing the wheel to the table 4 by means of a spacer sleeve 24 and a frictionally maintained tapered key 25; the latter being driven through a similarly tapered slot 26 in the extension 8. A coil spring 27, between the table 4 and the stepped block 7, urges the latter upward to maintain the centering step thereon in engagement with the opening in the rim 23. It will be appreciated by one skilled in the art that the apparatus described may be reoriented from a vertical position to a horizontal position with but minor conventional changes in arrangement.

In the basic structure of Fig. 1 and also that of Figs. 2 and 6 (described in detail hereinafter) the wheel securing means, and associated demounting devices, are substantially the same as those described in U.S. Patents 2,609,038 and 2,609,039, issued to R. D. Henderson on September 2, 1952. The method and apparatus of the invention is an improvement on the machine of the above patents. It will be understood that the invention may be embodied in other types of similar machines, and is not limited to such a combination. The inflating means may, if desired, be used by itself in a machine for inflating purposes only. The embodiment of the inflating means in a machine of the class illustrated shows the use of the invention in an application where at least two operations may be accomplished: that of holding the rim 23 (Fig. 1) on the table 4 while a tire 28 is mounted thereon; and then, while still so held, manipulating the tire 28 in a manner to permit inflation.

Figure 2:
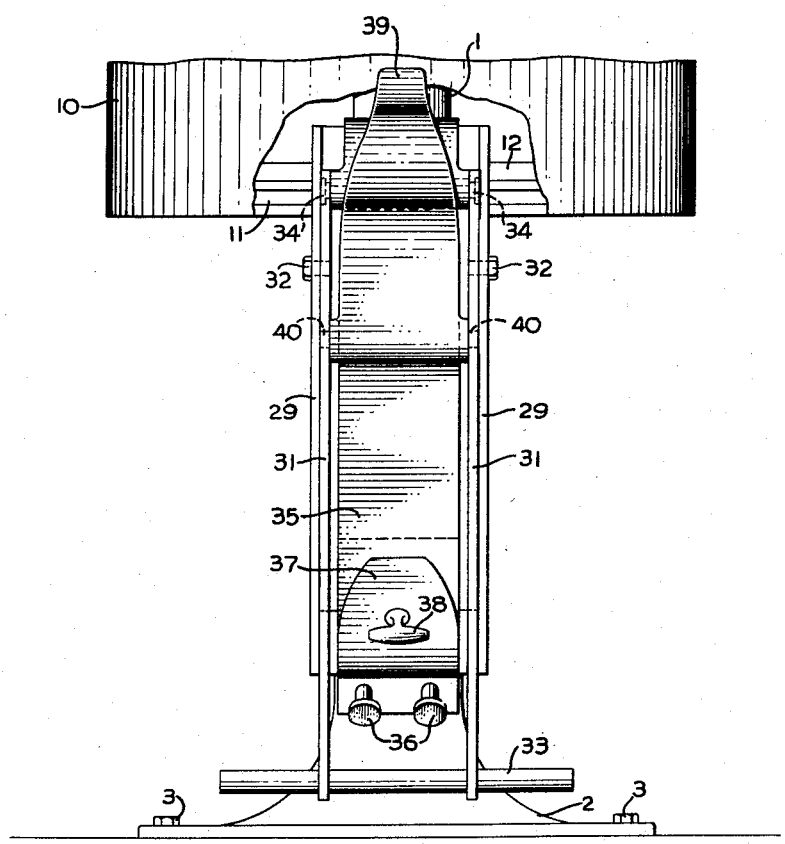
Fig. 2 is a side elevation of a portion of the machine of Fig. 1.

Provisions for demounting the tire 28 from the rim 23 may be provided, and, as shown in Figs. 1 and 2, are substantially of the arrangement shown in the above-referenced patents; Fig. 2 being a side elevation of a portion of the machine of Fig. 1 and included to clarify understanding of the apparatus immediately hereafter described. Referring to Figs. 1 and 2, two parallel spaced side plates 29 are shown and are suitably attached at the lower portions to the split-collar 19 in Fig. 1, and at the upper portions to a second split-collar 30 in Fig. 1. Two parallel spaced arms 31 are pivotally secured to the side plates 29 by pins 32. An actuating handle 33 is secured to the lower ends of the arms 31, and at the upper ends thereof, an upper bead breaker assembly is pivotally secured by a pin 34 and includes a curved member 35 pivoted by the upper end on the pin 34 and having two cylindrical pins 36 at the lower end. An upper bead breaker arm 37, slidably mounted on the pins 36, has a handle 38 intermediate its length and on the outer side thereof. Intermediate the pins 32 and the handle 33 on the arms 31, a lower bead breaker arm 39 is pivotally secured by pins 40.

In demounting a tire, the handle 33 of Fig. 1 is swung upwardly after placement of the upper bead breaker arm 37 and the lower bead breaker arm 39 on the upper and lower bead portions respectively of the tire 28 adjacent the rim flange. Upon movement of the arms 31 in a clockwise direction, the leverage, due to the shape of the bead breaker assembly, causes a section of the beads to be unseated from the rim 23. If necessary, the bead breaker assembly may be rotated horizontally to other positions on column 1, and the beads can be further unseated until completely dropped into the rim well.

In the tire mounting operation of the machine of Fig. 1, the drop-center wheel 23 is placed upon the table 4 and secured thereto as previously described. The tire 28 is then mounted on the wheel by means of auxiliary tools such as are more fully described in the above referenced patents or by other methods and apparatus well known in the art. At this stage of the operation, the tire 28 is lying loosely on the wheel 23 as shown in Fig. 1. Upon inspection, it will be apparent that if inflation of the tire 28 is now attempted by admitting air through a rim valve, air merely escapes through the opening between the tire beads and the rim 23. In the method of the invention, before inflation is attempted, the band 10 is moved upward by application of a force at the end of the lever 17, which conveniently may be done by means of the operator's foot pressing down on a foot pad 41 in Fig. 1.

Figure 3:
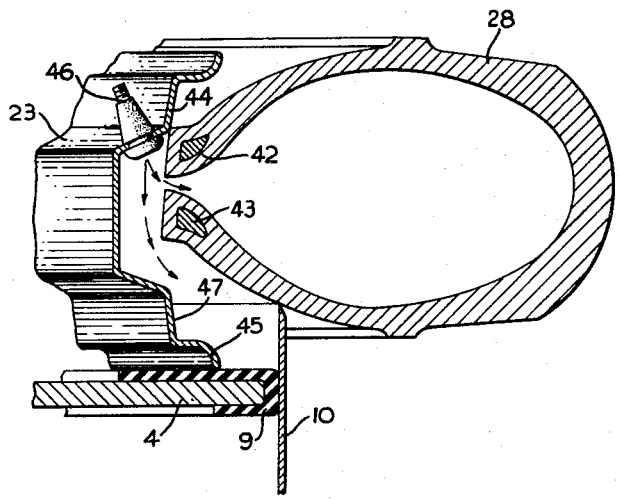
Fig. 3 is a cross-sectional view of the mounted tire with the band in position and at the start of the admission of pressurizing air therein.

As shown in Fig. 3, the upward movement of the band 10 urges the tire bead 42 upwardly until the heel of the bead 42 lies firmly against the inner edge of the bead seat 44 on the rim 23. As previously described, the rim 23 is firmly affixed to the table 4 thereby providing a pressure-tight seal between the rim flange 45 and the resilient sealing strip 9; the latter also bearing at its outer edge against the band 10 in slidable sealing relation. Thus an enclosed space is formed bounded by the rim 23, the tire 28, the strip 9, and the band 10.

Figure 4:
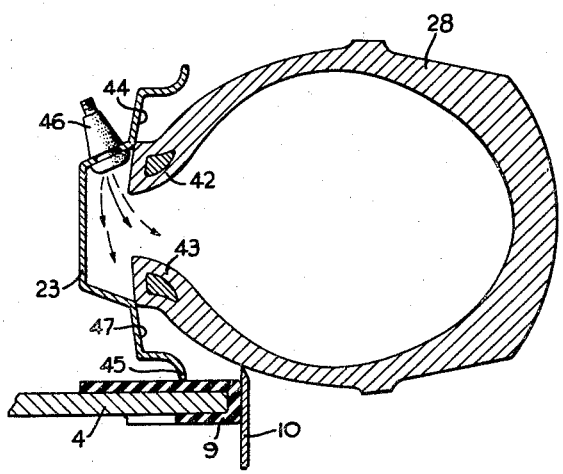
Fig. 4 is a view similar to Fig. 3 but with the beads partially seated.
Figure 5:
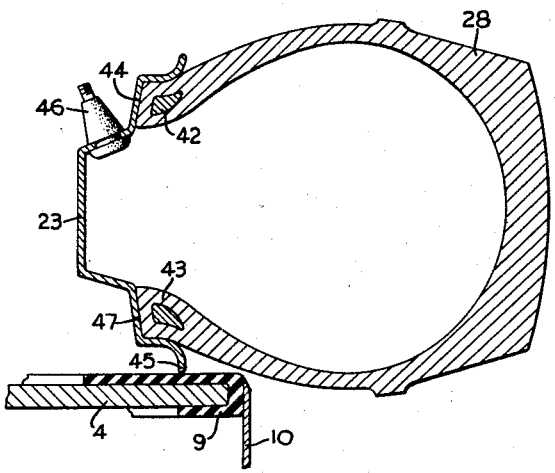
Fig. 5 is a view similar to Fig. 3 but at the end of the inflating cycle.

Upon admission of air into this space through a rim valve 46, the bead 43 is displaced downward as shown in Fig. 4, to meet its respective rim bead seat 47 on the rim 23. At the same time, the operator gradually permits the movement of the band 10 downwardly while maintaining an upward force thereupon sufficient to insure that the bead 42 stays in contact with the edge of the bead seat 44. As inflation continues, the beads 42 and 43 are forced to seat on the rim seats 44 and 47 respectively, until the position shown in Fig. 5 is reached, whereupon, after operating pressure is obtained, inflation is discontinued and the now mounted and inflated tire and rim may be removed.

The inward radial extension of the sealing strip 9 may be varied in order to accommodate a range of rim sizes, thus enabling the machine to inflate more than a single size wheel. Likewise the diameter of the band 10 may be designed such as to conform to a wide range of wheel sizes, inasmuch as the exact location of the line-of-contact between the band 10 and the sidewall of the tire 28 is not particularly critical; any contact along the inner radial portion of the sidewall being sufficient to effectively seal against air leakage.

Another embodiment of the invention is shown in Figs. 6, 7 and 8. A cylindrical column 48 is suitably secured to a base pedestal 49, which in turn is secured to a foundation by bolts 50. Slidingly interfitting within the bore of the column 48 is a table post 51 having an aligning piston-like portion 52 at the lower end thereof. The upper end of the post 51 is suitably connected to a table 53 through a supporting flange 54. The table 53 has an outer edge of circular shape and a rigid cylindrical band 55 encompasses the edge. The lower rim of the band 55 is turned upwardly to form the lower portion of a retaining channel 56, with the upper portion of the channel being formed by an offset shaped ring 57 suitably secured to the inner surface of the band 55. The upper end of the column 48 is sealed by a cap 58 having suitable provision therethrough for the free vertical movement of the table post 51. Immediately above the cap 58, and slidably engaging the post 51, is a spider arm assembly 59, preferably formed with three arms 60, each having T-shaped ends 61 to aligningly support the band 55. The associated bead-breaking tool previously described in connection with Figs. 1 and 2 is rotatably secured to the column 48 by means of upper and lower split-collars 62 and 63.

The table 53 has a resilient sealing strip 64 (similar to the strip 9 of Fig. 1) placed around the periphery thereof and extending substantially inwardly of the circumferential edge along both the upper and lower surfaces of the table 53. Extending upwardly and centrally of the table 53 is a post 65 having a reduced extension 66 thereabove.

Fig. 7 shows the interior of the column 48 in cross-section to illustrate the means whereby vertical movement of the table post 51, and consequently the table 53, is obtained. A hydraulic cylinder 67 has a piston 68 and a piston rod 69; the piston rod 69 being suitably secured to the member 52 at the upper end, and the cylinder 67 being secured at the lower end to a fixed lug 70. Fluid conduits 71, connected to a suitable source of pressure fluid not shown, extend from the cylinder 67 through a boss 72 on the base pedestal 49, and provide the means for operating the cylinder 67.

To illustrate another variation of the invention, Fig. 6 shows a drop-center rim 73, unmounted on a wheel. The rim 73 is rigidly affixed and centered on the upper surface of the table 53 by means of a hold-down spider 74 having a central hub portion 75 slidably engaging the extension 66. A tapered key 76, frictionally maintained in a suitable slot 77 through the extension 66, is utilized to in turn retain the spider 74. It will be obvious that the hold-down arrangements shown in Figs. 1 and 5 are interchangeable therebetween.

In operation, the piston 68 is moved downwardly when fluid is introduced into the cylinder through the supply line 71, and thus the table 53 also moves downwardly within the band 55. As the rim 73 is securely affixed to the table 53, as previously described, the sidewall portion of a tire 78 is consequently firmly brought to bear against the upper edge of the band 55, thus forming an enclosed space such as shown in Fig. 3. As air is admitted therein, the operator simultaneously and gradually permits the table 53 to move upwardly until the beads of the tire 78 are seated on the rim 73 and proper inflation pressure is obtained. It will now be understood that the method of operation illustrated in Figs. 3 through 5, is substantially applicable to the method and apparatus of Fig. 6, except for the fact that in the latter the table 53 is movable and the band 55 is fixed. It is also within the purview of the invention to move both the band and the table to effect the relative movement essential to proper operation.

Fig. 8 illustrates more clearly the method of attachment of the side plates 29 of the bead breaker assembly, to the split-collar 62. Bolts 79 clampingly secure the collar 62 to the shaft 51 in a manner permitting free movement of the shaft 51 therethrough. Portions of the side plates 29 are shaped to form flanges 80 which are held by one of the bolts 79 to the sides of the split-collar 62.

In Fig. 1, the purpose of the retaining channel 11 will now be more apparent. The demounting operation is of a nature such as to necessitate the movement of the bead-breaking device around the circumference of the tire. As will be evident from Fig. 1, the bead-breaker assembly may be rotated 360 degrees without interference. Likewise, in Fig. 5, such full rotation is possible. In Fig. 1 the channel 11 permits full rotation without movement of the band 10, and similar provision is obtained by the use of the channel 56 in Fig. 6.

It will be evident that the method of the invention may be utilized for certain applications by providing a large rectangular table having a multiplicity of bands rising therethrough or having segments therein that are lowered in the manner of the embodiment of the invention shown in Fig. 6. Also that conventional automatic and power devices may be utilized where appropriate to further refine the apparatus insofar as ease of operation and the like is concerned.

While certain representative embodiments and details have been shown for the purpose of illustrating the invention, it will be apparent to those skilled in this art that various changes and modifications may be made therein without departing from the spirit or scope of the invention.

I claim:

1. Apparatus for mounting and inflating a tubeless tire on a drop-center rim when the beads thereof fail to make sealing contact with the rim seating surfaces, comprising a table having a generally circular outer edge of a diameter sufficient to engage one side of a rim throughout the periphery thereof when placed against said rim and smaller than the overall outer diameter of the tire, a rim-securing means for holding a rim on the table with the outer edge of the rim in substantially airtight contact therewith, an annular band encircling the peripheral edge of the table and mounted for relative movement axially with respect thereto, and actuating means for moving the band and table relative to each other to bring the edge of the band into engagement with the sidewall of a tire mounted on said rim to thus effect a seal between the edge of the band and the tire sidewall, the edge of the table and the band having a close sliding fit therebetween to restrict the airflow from the tire to the atmosphere.

2. Apparatus as set forth in claim 1 in which the table is stationary and the band is movable.

3. Apparatus as set forth in claim 1 in which the table is movable and the band is stationary.

4. Apparatus as set forth in claim 1 in which said actuating means comprises a fluid-operated cylinder operatively connected to said band and table for moving said band and table axially relative to each other.

5. Apparatus for mounting and inflating a tubeless tire on a drop-center rim when the beads thereof fail to make sealing contact with the rim seating surfaces, comprising a table having a generally circular outer edge of a diameter sufficient to engage one side of a rim throughout the periphery thereof when placed against said rim and smaller than the overall outer diameter of the tire, a rim-securing means for holding a rim on the table with the outer edge of the rim in substantially airtight contact therewith, an annular band encircling the peripheral edge of the table and mounted for relative movement axially with respect thereto, and actuating means for moving the band and table relative to each other to bring the edge of the band into engagement with the sidewall of a tire mounted on said rim to thus effect a seal between the edge of the band and the tire sidewall, the table and band having sliding sealing means arranged therebetween to restrict the airflow from the tire to the atmosphere.

6. Apparatus for mounting and inflating a tubeless tire on a drop-center rim when the beads thereof fail to make sealing contact with the rim seating surfaces, comprising a table having a generally circular outer edge of a diameter sufficient to engage one side of a rim throughout the periphery thereof when placed against said rim and smaller than the overall outer diameter of the tire, a rim-securing means for holding a rim on the table at the outer edge of the rim in substantially airtight contact therewith, an annular band encircling the table and mounted for relative movement axially with respect thereto, and actuating means for moving the band and table relative to each other to bring the edge of the band into engagement with the sidewall of a tire mounted on said rim to thus effect a seal between the edge of the band and the tire sidewall, the table and band having sliding sealing means arranged therebetween to restrict the airflow from the tire to the atmosphere, said actuating means comprising a manually operated lever connected to said band and table for moving said band and table axially relative to each other.

7. Apparatus for use in inflating a tubeless tire when mounted on a drop-center rim, the tire being of conventional open-bellied type having side walls terminating in beads at the open side thereof, comprising a member adapted to be sealed against the side of the rim flange in substantially airtight engagement therewith throughout the periphery thereof, and a movable substantially air-impervious annular band encircling said member and said member at its circumference conforming in shape to the adjacent inner circumferential surface of said band, said band having axial sliding movement relative to said member whereby said band may be moved axially to position an edge thereof against the adjacent side wall of a tire mounted on a rim operatively held in position against said member to thus engage the side wall of the tire with the portion of said band between said member and tire closing the gap between said tire and member and, on continued movement of said band in the same direction, said band will move said side wall toward the opposite side wall of the tire whereby to force the bead on said latter side wall onto its rim seat, said member and band having a close sliding fit to restrict flow of air therebetween during inflation of said tire.

8. Apparatus as set forth in claim 7 including clamping means for holding said rim against said member.

9. Apparatus as set forth in claim 7 in which there is a flexible sealing strip between said member and band which permits relative sliding movement between said member and band while effecting its purpose as a seal.

References Cited in the file of this patent

UNITED STATES PATENTS

| | | |
|---|---|---|
| 1,352,722 | Caldwell | Sept. 14, 1920 |
| 1,966,580 | Bull | July 17, 1934 |
| 2,418,849 | Polt | Apr. 15, 1947 |
| 2,538,759 | Briggs | Jan. 23, 1951 |
| 2,609,038 | Henderson | Sept. 2, 1952 |
| 2,792,057 | Schreiner | May 14, 1957 |

FOREIGN PATENTS

| | | |
|---|---|---|
| 607,925 | Great Britain | Sept. 7, 1948 |